United States Patent [19]

Pemberton

[11] Patent Number: 5,018,349
[45] Date of Patent: May 28, 1991

[54] EXHAUST EFFICIENCY INCREASING APPARATUS

[76] Inventor: Joseph H. Pemberton, 801 E. Main, Artesia, N. Mex. 88210

[21] Appl. No.: 536,971

[22] Filed: Jun. 12, 1990

Related U.S. Application Data

[63] Continuation-in-part of Ser. No. 388,240, Jul. 31, 1989, Pat. No. 4,947,645.

[51] Int. Cl.$^5$ .............................................. F02B 27/02
[52] U.S. Cl. .......................................... 60/313; 60/323
[58] Field of Search ................................... 60/313, 323

[56] References Cited

U.S. PATENT DOCUMENTS 4,926,634  5/1990  Pütz ........................................ 60/313

FOREIGN PATENT DOCUMENTS 170815  10/1983  Japan ..................................... 60/313
178820  10/1983  Japan ..................................... 60/313
212622   9/1986  Japan ..................................... 60/313
1025906  6/1983  U.S.S.R. ................................ 60/313

*Primary Examiner*—Douglas Hart
*Attorney, Agent, or Firm*—Deborah A. Peacock; Donovan F. Duggan

[57] ABSTRACT

The disclosure is directed to an exhaust efficiency increasing apparatus incorporating crossover ducts between dual exhaust conduits extending from an engine having two cylinder banks. The ducts are disposed to communicate with upstream entry and downstream exit apertures on the exhaust conduits and cross in an "X". Since where the ducts are positioned affects engine torque, torque curves can be adjusted or changed by adjustably positioning the crossover ducts within a housing which is placed in the exhaust system, to move the crossover ducts nearer to or further from the engine, by computer or manual control. A second embodiment incorporates at least two spaced duct pairs disposed to increase low end torque and high end output.

34 Claims, 6 Drawing Sheets

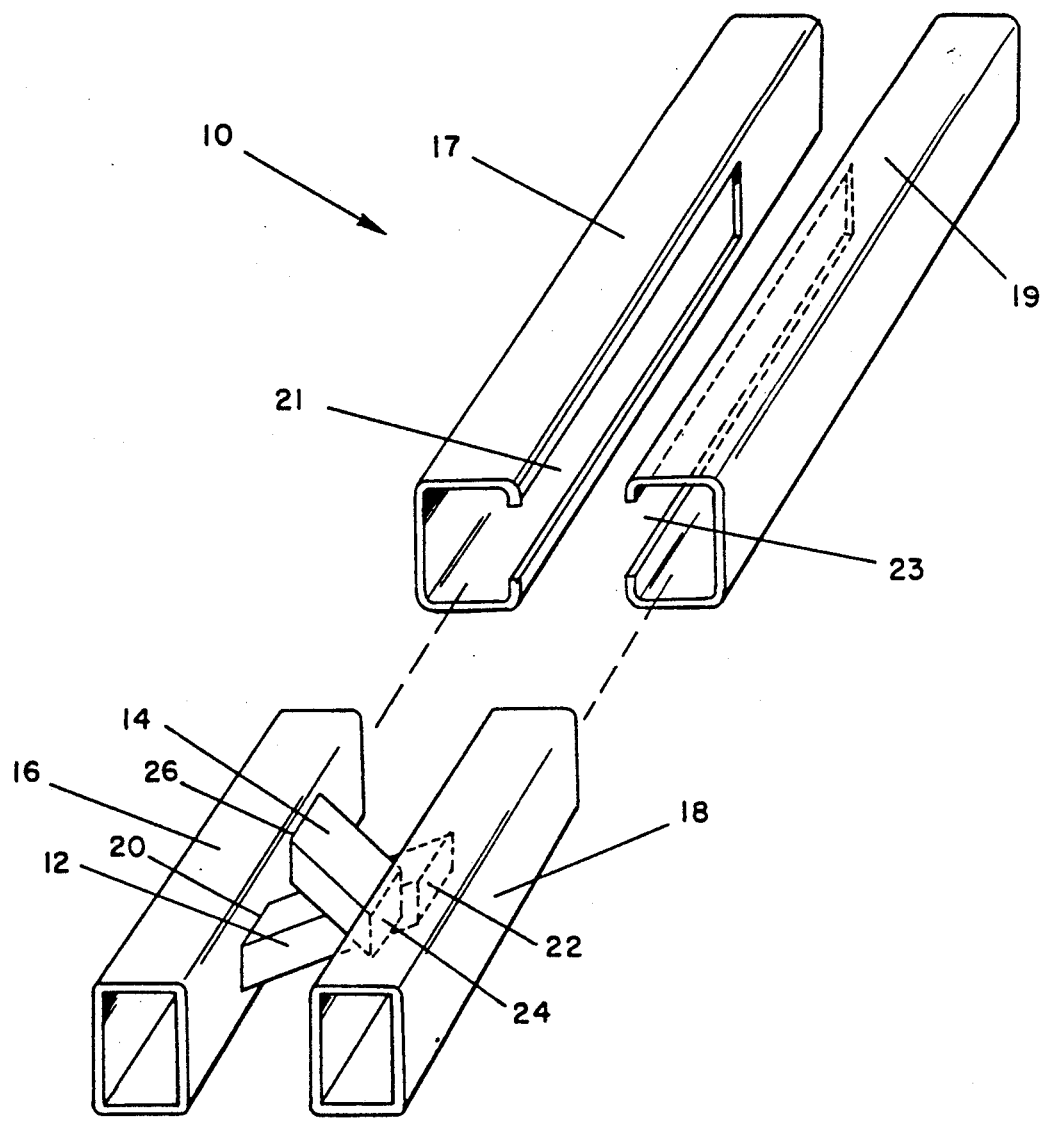
FIG—1

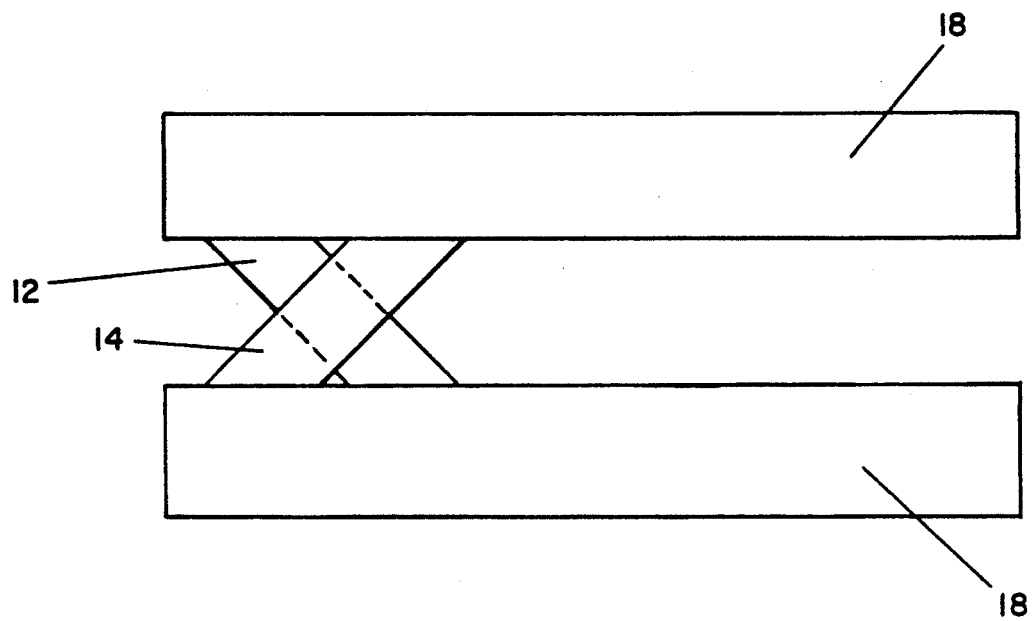
FIG — 1a
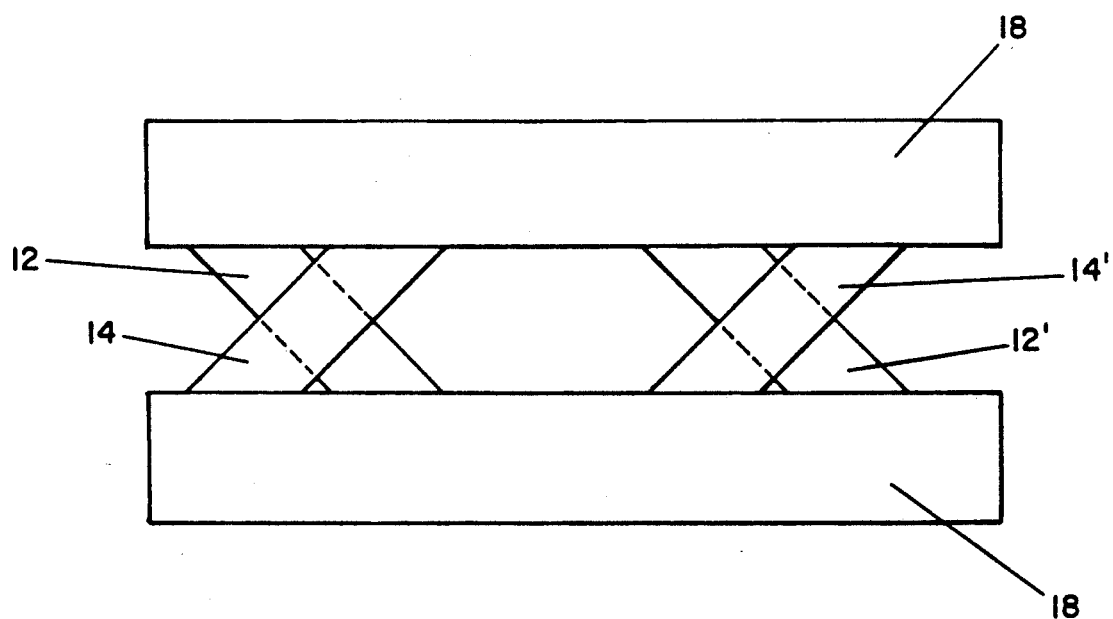
FIG — 2

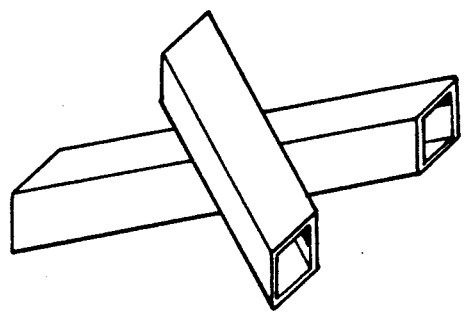
FIG—3a
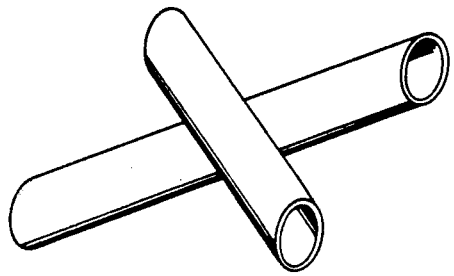
FIG—3b
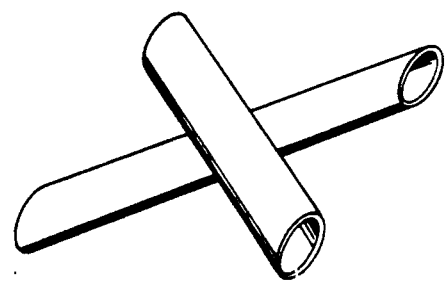
FIG—3c
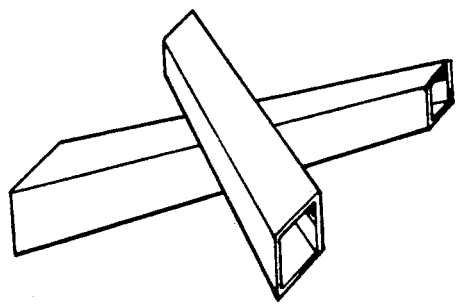
FIG—3d
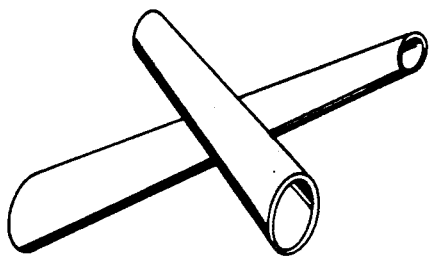
FIG—3e
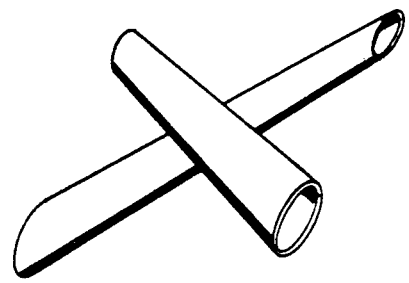
FIG—3f

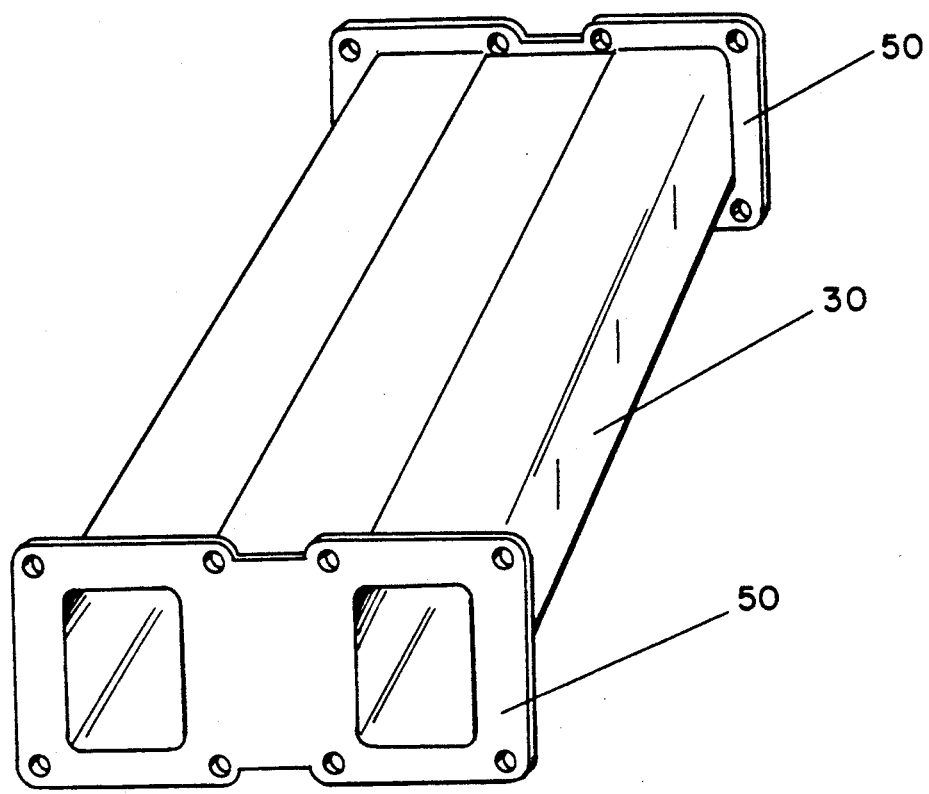
FIG—4

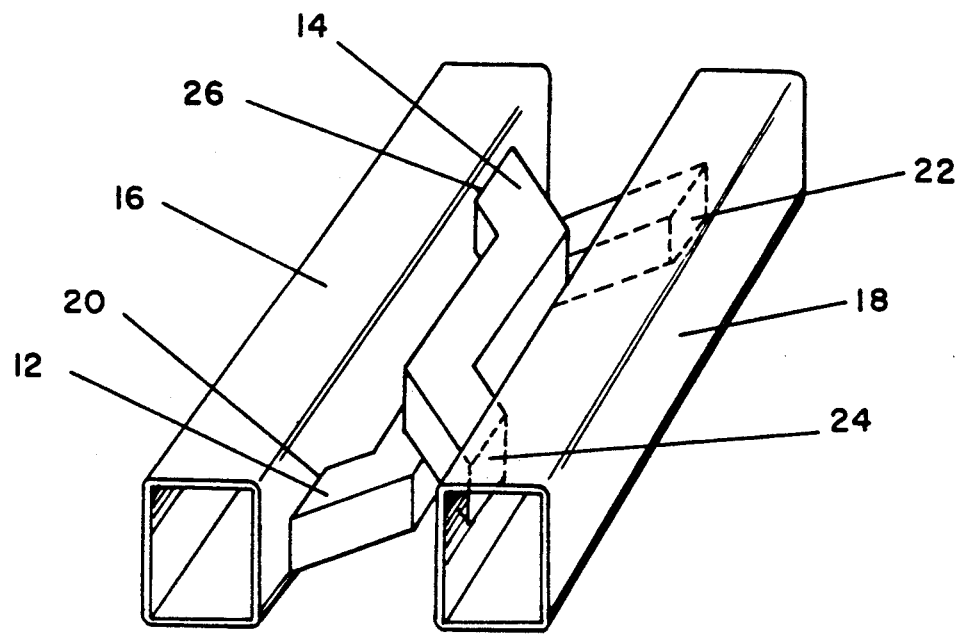
FIG—6
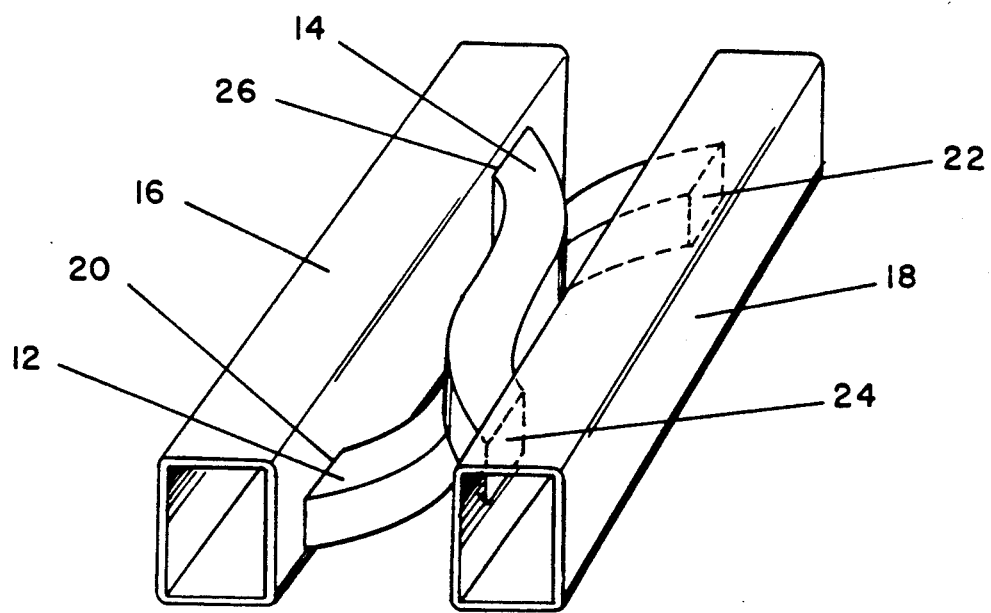
FIG—7

5,018,349

EXHAUST EFFICIENCY INCREASING APPARATUS

CROSS-REFERENCE TO RELATED APPLICATIONS

This application is a continuation-in-part application of U.S. patent application Ser. No. 07/388,240, entitled *Exhaust Efficiency Increasing Apparatus* to Joseph H. Pemberton, filed on July 31, 1989, now U.S. Pat. No. 4,947,645, the teachings of which are incorporated herein by reference.

BACKGROUND OF THE INVENTION

1. Field of the Invention (Technical Field)

The invention relates to increasing power and torque through increasing exhaust efficiency in internal combustion engines having two banks of cylinders and more particularly to an apparatus for cross-communicating between the exhaust conduits from each of the banks of cylinders to increase the power output of the engine and control its torque curve.

2. Description of the Related Art Including Information Disclosed under 37 C.F.R. §1.97-1.99 (Background Art)

Although much thought has gone into designing intake systems for existing internal combustion engines, the primary consideration for designing exhaust systems has been cost. However, just as the induction of gases into internal combustion engines is important, the extraction of gases is equally important.

The construction of an exhaust system should compliment the requirements of the engine. Diameter, length, and culmination of exhaust runners into one collector can significantly influence efficiency through pressure equalization and scavenging of the exhaust gases.

In V-8s, V-6s, and the like, automobile manufacturers at present typically use "crossover" pipes which provide pressure equalization between the two existing pipes exhausting gases from two cylinder banks.

In practicing the invention, an adjustable crossover apparatus is provided. It can be configured to provide desired torque characteristics for a particular engine or for a selected use and can be incorporated into the exhaust system of the engine. For example, more torque is usually needed for loaded conditions than for non-loaded conditions. Thus, more torque is needed for going uphill than downhill, and for towing a trailer than for not pulling a trailer.

SUMMARY OF THE INVENTION (DISCLOSURE OF THE INVENTION)

In accordance with the present invention, there is provided an apparatus for increasing exhaust efficiency for an internal combustion engine having two banks of cylinders, a left bank and a right bank, there being a separate exhaust conduit from each bank, a left exhaust conduit and a right exhaust conduit, respectively. The apparatus comprises first structure for communicating from the left exhaust conduit to the right exhaust conduit, the first communicating structure extending from a position on the left conduit a selected distance from the left cylinder bank to a preselected position on the right exhaust conduit, the preselected position on the right exhaust conduit being further from the right cylinder bank than the selected position on the left exhaust conduit extends from the left cylinder bank. A second structure is provided for communicating from the right exhaust conduit to the left exhaust conduit, the second communicating structure extending from a position on the right conduit a selected distance from the right cylinder bank to a preselected position on the left exhaust conduit, the preselected position on the left exhaust conduit being further from the left cylinder bank than the selected position on the right exhaust conduit is from the right cylinder bank.

In the preferred embodiment of the invention, means for adjustably positioning, by computer control or vehicle operator control, the first and second structures on the exhaust conduits at two or more selected positions from the cylinder banks without disconnecting the apparatus from the exhaust conduits is also provided. The adjustable placement of the apparatus on the exhaust conduits provides varying torque curves for the engine.

In an alternative embodiment, the first means for communicating from the left exhaust conduit to the right exhaust conduit, and the second means for communicating from the right exhaust conduit to the left exhaust conduit each comprise more than one duct. These multiple pairs of ducts are disposed on the exhaust conduits at several selected positions from the cylinder banks.

The first and second communicating structures preferably comprise first and second fluid conducting structure such as ducts. Each of the fluid conducting structures can comprise one or more ducts. The cross-sectional areas of the ducts are preferably substantially smaller than the cross-sectional areas of the exhaust conduits and cross over one another such as in an "x" configuration. The first and second ducts are preferably substantially of the same length and of the same cross-sectional area and thereby substantially of the same size. The cross-sectional configurations of the ducts can be rectangular, circular, oval, or of other selected cross-section, such as that of the well-known National Aeronautics and Space Administration (NASA) duct shape. The entry and exit apertures of the duct can be larger and smaller, respectively. The ducts preferably cross at between about 40° and about 50°, and most preferably at about 40°. The apparatus of the invention will affect the torque curve of the engine depending upon where it is placed the exhaust system in terms of distance from the cylinder banks.

One object of the invention is to increase exhaust efficiency in an internal combustion engine having two banks of cylinders.

A second object of the invention is to increase power output in an internal combustion engine having two banks of cylinders.

A third object of the invention is to provide an adjustable or controllable torque curve for an internal combustion engine having two banks of cylinders.

One advantage of the present invention is that power output of an internal combustion engine is substantially increased utilizing the invention.

Another advantage of the present invention is that engine torque curves can be readily changed and adjusted using an apparatus in accordance with the present invention.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention.

FIG. 1 illustrates a preferred slidably adjustable embodiment of the invention incorporatable in a dual exhaust system emanating from an internal combustion engine having two banks of cylinders, each of which has its own exhaust conduit;

FIG. 1a is a top view of the preferred embodiment of the invention;

FIG. 2 shows an alternative embodiment of the invention;

FIGS. 3a-3f show various communicating ducts suitable for use in the embodiments of FIGS. 1 and 2;

FIG. 4 depicts a housing suitable for containing the embodiments of the invention;

FIG. 6 is a top view of an alternative embodiment of the crossover ducts of the invention; and FIG. 7 is a top view of another alternative embodiment of the crossover ducts of the invention.

Figure 5:
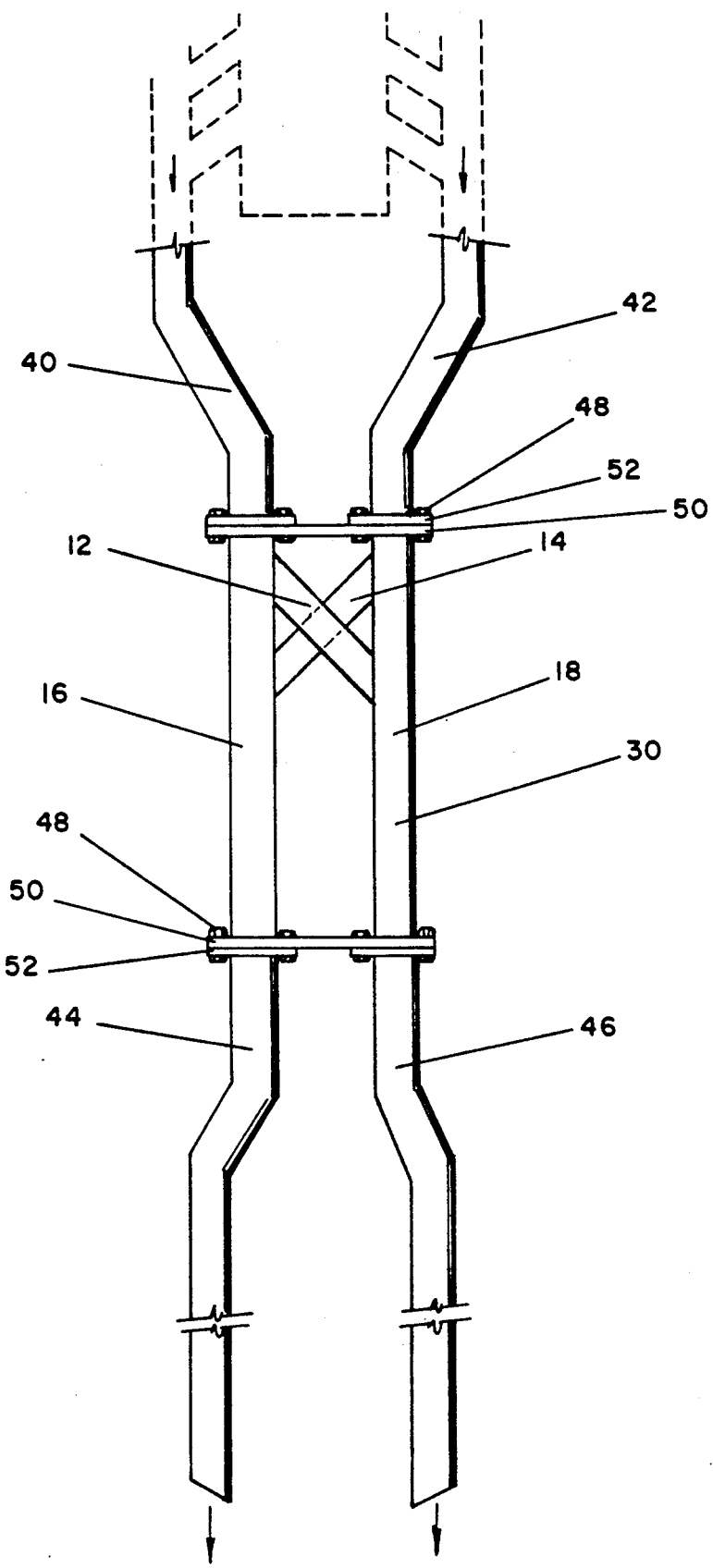
FIG. 5a is a top view of the FIG. 1 preferred embodiment in place in an exhaust system.
FIG. 5b is a top view of the FIG. 2 embodiment in place in an exhaust system.

DETAILED DESCRIPTION OF THE PREFERRED EMBODIMENTS OF THE INVENTION (BEST MODES FOR CARRYING OUT THE INVENTION)

Reference is now made to FIG. 1 which illustrates a preferred embodiment of the invention 10 comprising crossing hollow ducts 12 and 14 which form an "x" configuration between two separate exhaust internal, tubes 16 and 18, slidably adjustable within slotted conduits 17 and 19 in a dual exhaust system of a vehicle having an internal combustion engine having two cylinder banks, such as a V-6, a V-8, or an opposing configuration, such as in a 4-cylinder Porsche or Volkswagen.

In practicing the invention, the cross-sectional areas of the ducts 12 and 14 are preferably substantially smaller than the cross-sectional areas of the exhaust conduits 16 and 18. Uniquely and significant to improved efficiency utilizing the invention, duct 12 connects to right exhaust conduit 16 closer to the cylinder bank from which exhaust gases flow than it connects to left exhaust conduit 18. Therefore, the exhaust gases from the right conduit 16 flow through crossover duct 12 into conduit 18. Similarly, exhaust gases from the left cylinder bank flow through exhaust conduit 18 and through crossover duct 14 into conduit 16. Crossover duct 12 connects through an aperture 20 in conduit 16 to an aperture 22 in conduit 18. Crossover duct 14 connects through an aperture 24 in left exhaust conduit 18 to an aperture 26 in right exhaust conduit 16. Ducts 12 and 14 are typically welded in place.

In accordance with the invention, each duct effectively connects from a relatively upstream position on one exhaust to a downstream position on the other exhaust. It is preferable that both the left and right exhaust conduits be of essentially the same length and matched or, substantially or operationally, mirror images of one another. Although in the preferred and alternative embodiments of FIGS. 1 and 2, the crossover ducts 12 and 14 form a simple "x," as seen in FIGS. 3a-3f, 5a, and 5b, those skilled in the art will appreciate that the ducts could be otherwise configured. For example, they could be s-shaped curves, as shown in FIGS. 6 and 7, be made longer, wrap around either of the exhaust conduits, or the like.

As shown in FIGS. 1 and 5a, tubes 16 and 18 are slidably adjustable along the length of slots 21 and 23 (see arrows in FIG. 5a), though any suitable mechanical means available to those skilled in the art, such as a cable, worm gear, hydraulic piston, electrical linear motors, or the like, may be utilized in accordance with the invention. Vacuum conditions of an engine are directly related to torque, so the apparatus of the invention can be adapted by those skilled in the art to respond to a change in vacuum by means of state-of-the-art electronics. The adjustment can be computer controlled in accordance with engine manifold vacuum or pressure, which changes in accordance with power demands put on the engine, engine revolutions per minute (rpm), and the like. Alternatively, the adjustment can be controlled manually by the vehicle operator in accordance with his or her wishes for more low end torque, high end power, etc.

Significantly, the distance at which the crossover ducts of the apparatus of the invention are disposed downstream from the headers, or exhaust manifolds from the left and right cylinder banks, will affect the torque curve of the engine. When they are positioned closer to the engine, the torque curve experiences relatively higher low end torque. When the crossover ducts of the exhaust apparatus are placed further from the engine, the engine produces greater high end torque. Thus, the slidability of the FIGS. 1 and 5a embodiments offers adjustability to maximize engine output over an engine's entire operating rpm range.

An alternative embodiment of the invention having multiple paired, front and rear crossover ducts is shown in FIGS. 2 and 5b. Additional crossovers 12' and 14' provide increased low and high end engine output. The crossover ducts can be located, as desired, to optimize performance. Although FIGS. 2 and 5b show two pairs of ducts, more than two pairs may be useful in accordance with the invention.

FIG. 4, shows a housing 30 in which either the preferred embodiment of FIG. 1 or the alternative embodiments of FIG. 2 can be disposed. FIGS. 5a and 5b show top views of the FIG. 1 and FIG. 2 embodiments, respectively, as disposed in housing 30, seen in FIG. 4 in place in a typical dual exhaust system connected to forward exhaust pipe sections 40 and 42 and rear exhaust pipe sections 44 and 46, using bolts 48 and flanges 50 and 52.

In practicing the invention, the angle at which the crossover ducts 12 and 14 exit and enter the exhaust conduits may be varied to provide optimum performance for a particular engine and exhaust system configuration. Furthermore, the ducts 12 and 14 need not be straight, but could be of various shapes. For example, FIG. 6 shows an alternative embodiment of the crossover ducts of the invention having angled s-shaped ducts and FIG. 7 shows still another embodiment of the crossover ducts of the invention having curved s-shaped ducts. Experimentation by practitioners in the art will provide optimal entry and exit angles, optimal crossover duct size, and taper, if any, and optimal crossover duct length relative to exhaust conduit size, length, and configuration for particular applications in accordance with generally or well known engineering principles.

Location of catalytic converters in today's systems varies, some having one converter and others having as many as three. On a typical three-converter system, there are two "pup" converters located immediately after the exhaust manifold flange. The third and last converter is usually mounted midstream in the exhaust system. At the point of the large midstream converter, the right and left exhaust pipes converge into one. It could therefore be necessary to install an apparatus in accordance with the invention between the rear of the engine and in front of the converter. However, the optimum location of the floating crossover is preferably immediately behind where right and left bank pipes come close enough to each other to do so.

Those skilled in the art will appreciate that although multiple crossovers added to the exhaust system after an initial crossover may have diminishing results, strategically placed multiple crossovers can deliver a broad torque range and good results in high and low RPM ranges.

Although due to manufacturing design and cost requirements, a compromise system is more likely to interest manufacturers, the crossover system of the invention seems to optimally increase efficiency and horsepower when located in the "hot spot" of an exhaust system, i.e., where the exhaust temperature is highest.

The cross-sectional configuration of the exit and entry and apertures 20, 22, 24, and 26 of the crossover ducts 12 and 14 shown in FIG. 1 can be designed to encourage smooth gas flow. Apertures having a rectangular (see FIGS. 3a and 3d), oval (see FIGS. 3b and 3e) and circular (see FIGS. 3c and 3f) duct designs can be used in either the FIG. 1 or the FIG. 2 embodiments. Too, the crossover ducts can be of variable cross section with the small part of the duct to the front and large part to the rear are very satisfactory. Exit ducts are preferably oppositely positioned, with the large part of the aperture to the rear and the small part to the front. Rectangular, oval and circular cross section ducts being smaller at the entry end and larger at the exit end, such as the tapered ducts shown in FIGS. 3d–3f, can be used in the FIGS. 1 and 2 embodiments. The entry and exit apertures can also vary in size with the entry aperture significantly larger than the exit aperture.

An approximate angle of between about 40° and 50°, and preferably about 45°, of crossover ducts to the exhaust conduits provides excellent right and left bank pressure equalization in the preferred embodiment.

The invention has been described in detail with particular reference to a preferred embodiment thereof, but it will be understood that variations and modifications can be effected within the scope of the invention.

What is claimed is:

1. An apparatus for increasing exhaust efficiency for an internal combustion engine having two banks of cylinders, a left bank and a right bank, there being a separate exhaust conduit from each bank of cylinders, a left exhaust conduit and a right exhaust conduit, respectively, the apparatus comprising:

first means for communicating from the left exhaust conduit to the right exhaust conduit, said first communicating means extending from a position on the left conduit a selected distance from the left cylinder bank to a preselected position on the right exhaust conduit, said preselected position on the right exhaust conduit being further from the right cylinder bank than the selected position on the left exhaust conduit is from the left cylinder bank;

second means for communicating from the right exhaust conduit to the left exhaust conduit, said second communicating means extending from a position on the right conduit a selected distance from the right cylinder bank to a preselected position on the left exhaust conduit, said preselected position on the left exhaust conduit being further from the left cylinder bank than the selected position on the right exhaust conduit is from the right cylinder bank; and means for adjustably positioning said first and second means on the exhaust conduits at two or more selected positions at different positions from the cylinder banks without disconnecting said apparatus from the exhaust conduits.

2. The invention of claim 1 wherein said first and second communicating means comprise first and second fluid conducting means, respectively.

3. The invention of claim 2 wherein said first and second fluid conducting means comprise first and second ducts.

4. The invention of claim 3 wherein said ducts comprises cross sectional areas substantially smaller than the cross section areas of the exhaust conduits.

5. The invention of claim 3 wherein said first and second ducts cross over one another.

6. The invention of claim 4 wherein said ducts cross over one another in an "x" configuration.

7. The invention of claim 4 wherein said first and second ducts are of substantially the same length.

8. The invention of claim 4 wherein said first and second ducts are of substantially the same cross sectional area.

9. The invention of claim 4 wherein said first and second ducts are of substantially the same size.

10. The invention of claim 4 wherein said first and second ducts comprises essentially rectangular cross sections.

11. The invention of claim 4 wherein said first and second ducts comprises essentially circular cross sections.

12. The invention of claim 4 wherein said first and second ducts comprises essentially oval cross sections.

13. The invention of claim 4 wherein each of said first and second ducts comprises an entry aperture and an exit aperture, said entry aperture being larger in cross section than said exit aperture.

14. The invention of claim 13 wherein said first and second ducts comprises essentially rectangular cross sections.

15. The invention of claim 13 wherein said first and second ducts comprises essentially circular cross sections.

16. The invention of claim 13 wherein said first and second ducts comprises essentially oval cross sections.

17. The invention of claim 4 wherein said first and second ducts enter and exit said left and right exhaust conduits at an angle thereto between about 40° and about 50°.

18. The invention of claim 1 wherein said means for adjustably positioning said first and second communicating means comprises means for, under computer control, selectively positioning said first and second means on the exhaust conduits from the cylinder banks in order to affect the torque curve of the engine.

19. The invention of claim 1 wherein said means for adjustably positioning said first and second communicating means comprises means for under vehicle operator control selectively positioning said first and second means on the exhaust conduits from the cylinder banks in order to affect the torque curve of the engine.

20. An apparatus for increasing exhaust efficiency for an internal combustion engine having two banks of cylinders, a left bank and a right bank, there being a separate exhaust conduit from each bank of cylinders, a left exhaust conduit and a right exhaust conduit, respectively, the apparatus comprising:

first means comprising more than one duct for communicating from the left exhaust conduit to the right exhaust conduit, said first communicating means extending from a position on the left conduit a selected distance from the left cylinder bank to a preselected position on the right exhaust conduit, said preselected position on the right exhaust conduit being further from the right cylinder bank than the selected position on the left exhaust conduit is from the left cylinder bank;

second means comprising more than one duct for communicating from the right exhaust conduit to the left exhaust conduit, said second communicating means extending from a position on the right conduit a selected distance from the right cylinder bank to a preselected position on the left exhaust conduit, said preselected position on the left exhaust conduit being further from the left cylinder bank than the selected position on the right exhaust conduit is from the right cylinder bank; and means for disposing said ducts of said first and second means on the exhaust conduits at several selected positions at different distances from the cylinder banks.

21. The invention of claim 20 wherein said ducts comprises cross sectional areas substantially smaller than the cross sectional areas of the exhaust conduits.

22. The invention of claim 20 wherein said first and second ducts cross over one another.

23. The invention of claim 20 wherein said ducts cross over one another in an "x" configuration.

24. The invention of claim 20 wherein said first and second ducts are of substantially the same length.

25. The invention of claim 20 wherein said first and second ducts are of substantially the same cross sectional area.

26. The invention of claim 20 wherein said first and second ducts are of substantially the same size.

27. The invention of claim 27 wherein said first and second ducts comprises essentially rectangular cross sections.

28. The invention of claim 20 wherein said first and second ducts comprises essentially circular cross sections.

29. The invention of claim 20 wherein said first and second ducts comprises essentially oval cross sections.

30. The invention of claim 20 wherein each of said first and second ducts comprises an entry aperture and an exit aperture, said entry aperture being larger in cross section than said exit aperture.

31. The invention of claim 30 wherein said first and second ducts comprises essentially rectangular cross sections.

32. The invention of claim 30 wherein said first and second ducts comprises essentially circular cross sections.

33. The invention of claim 30 wherein said first and second ducts comprises essentially oval cross sections.

34. The invention of claim 20 wherein said first and second ducts enter and exit said left and right exhaust conduits at an angle thereto between about 40° and about 50°.

* * * * *